United States Patent [19]

Ensley

[11] 4,456,912

[45] Jun. 26, 1984

[54] HIGH ENERGY MICROWAVE DEFENSE SYSTEM

[75] Inventor: Donald L. Ensley, Danville, Calif.

[73] Assignee: Harvest Queen Mill & Elevator Company, Plainview, Tex.

[21] Appl. No.: 240,420

[22] Filed: Apr. 3, 1972

[51] Int. Cl.³ .............................................. G01S 13/86
[52] U.S. Cl. ........................................ 343/6 R; 330/4
[58] Field of Search ................... 330/4; 343/6 R, 5 R

[56] References Cited

U.S. PATENT DOCUMENTS

| 2,962,585 | 11/1960 | Bolef et al. | 330/4 X |
| 3,258,767 | 6/1966 | Jacobsen | 330/4 X |
| 3,427,611 | 2/1969 | Enenstein | 343/6 R |

FOREIGN PATENT DOCUMENTS 1914250  10/1970  Fed. Rep. of Germany ..... 244/3.16

OTHER PUBLICATIONS

"Lasers: Devices and Systems–Part III," by S. Y. Vogel, Electronics, Nov. 1961, pp. 81–85.

Primary Examiner—T. H. Tubbesing
Attorney, Agent, or Firm—Richards, Harris & Medlock

[57] ABSTRACT

A defense system wherein a radar intercepts and follows a target and includes an antenna array and a low level source of microwave energy for exciting the elements of the array to produce radar returns and define the path. A microwave storage reservoir is supplied upon demand with high energy microwave energy and is coupled to microwave feed channels leading to the elements of the antenna array. Microwave dump switches at the juncture of the channels and the reservoir control flow of energy from the reservoir. Control means responsive at least in part to the presence of returns periodically actuate the dump switches for flow of microwave energy from the reservoir to the target via the antenna array.

9 Claims, 5 Drawing Figures

HIGH ENERGY MICROWAVE DEFENSE SYSTEM

This invention relates to the utilization of high energy electromagnetic waves, and more particularly to a method and system for accumulating and releasing high energy electromagnetic waves in a medium such as the earth's atmosphere.

In national defense, expenditures of time and money are being made in the area of ballistic missiles defenses. One purpose is to provide a defense system specifically directed to destruction of enemy missiles during flight long before a target is reached. The high cost of such systems is occasioned by the necessity of propelling and guiding a physical mass along a path at such speeds as to enable it to collide with or otherwise destroy an enemy missile in flight.

The present invention avoids much of the difficulty encountered in such systems by generating and focusing electromagnetic energy of high intensity to a target to impact the target with electromagnetic energy traveling at the speed of light. Radar systems heretofore have been developed for locating bodies traveling at high speeds through the earth's atmosphere and tracking them. Radars are highly developed and provide reliable information which in an early warning sense heralds the approach of missiles, for example, and provides data to define the path and identify the target point.

The present invention is provided to operate in conjunction with a radar system to generate and store a high quantity of electromagnetic energy and then to dump such energy from storage, feeding the same to an antenna for transmission along the path controlled by the radar. The electromagnetic energy will be focused onto the airborne body with such magnitude as to impart destructive action thereto.

More particularly, in accordance with the present invention, a system is provided for operation of a phased array radar to intercept and follow the path of a body spaced from the radar and includes an antenna array and a source of microwave energy for exciting the array to produce target dependent radar returns.

Further, one or more evacuated microwave storage reservoirs are provided with microwave feed channels leading from the reservoir to elements of the antenna array. Microwave dump switches located at the juncture of the channels and the reservoir permit extraction of energy from the reservoir. Means responsive at least in part to the presence of radar returns actuate the dump switches for flow of microwave energy from the reservoir to the body via the antenna array.

In a further aspect, the invention employs the method of focusing a phased array radar onto a body traveling along a path spaced from the radar, repeatedly storing over substantial intervals microwave energy in a microwave storage reservoir, periodically dumping the energy stored from the radar via channels leading to the array for transmission of high energy microwaves to said body. Microwave energy is fed over a substantial period of time into a reservoir having superconductive walls with windows therein normally coated with a superconductive material which responsive to local heating momentarily become transmissive to the microwave energy stored in the reservoir.

For a more complete understanding of the present invention and for further objects and advantages thereof, reference may now be had to the following description taken in conjunction with the accompanying drawings in which.

Figure 1:
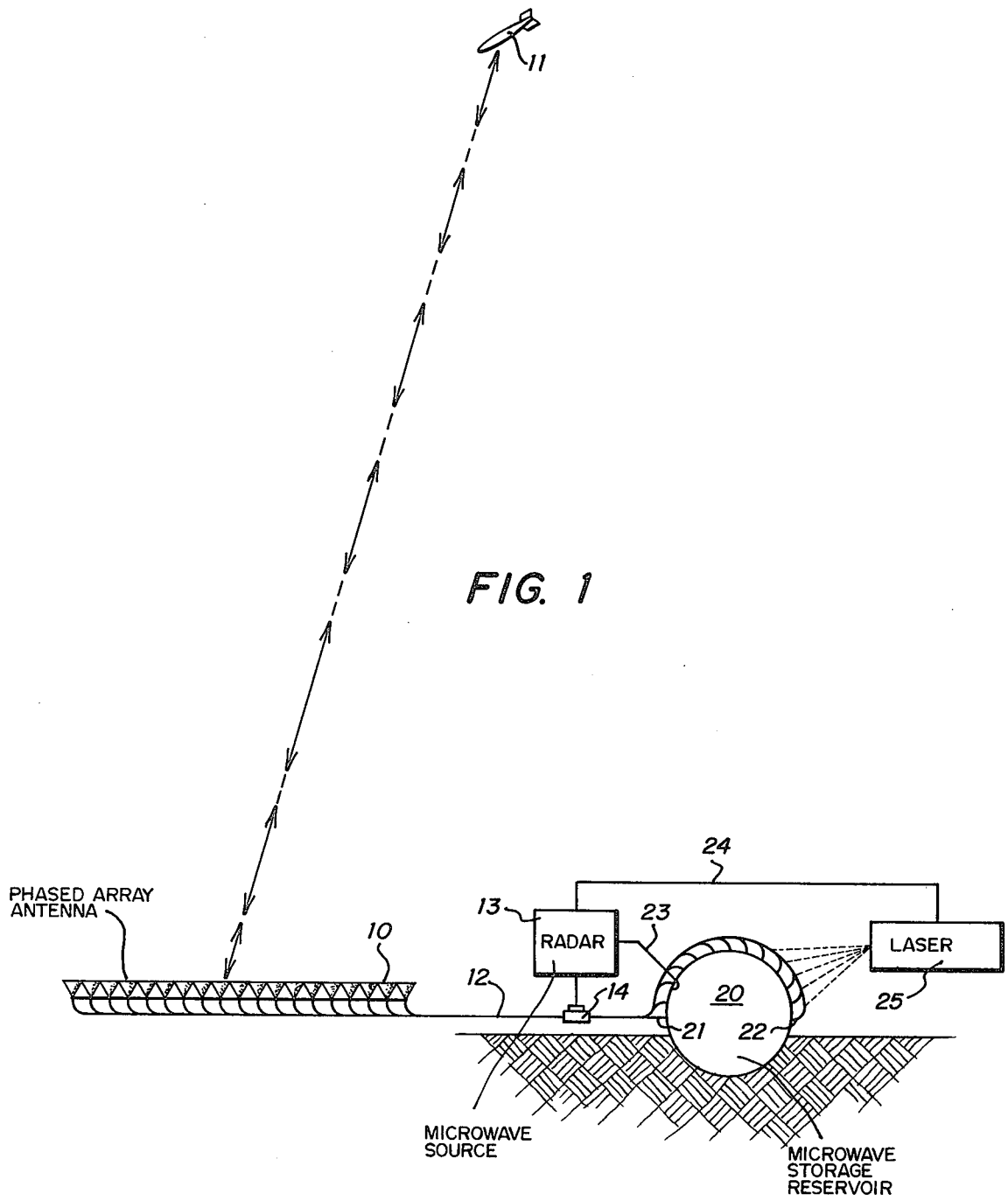
FIG. 1 is a schematic representation illustrating operation of the present invention.

Referring now to FIG. 1, a schematic representation of the invention has been shown wherein a phased array radar antenna 10 is provided on the earth's surface for tracking aircraft or projectiles such as the projectile 11 during flight through the earth's atmosphere at a range of the order of a hundred miles. The antenna 10 is fed by way of channels 12 from a radar control unit 13 which is coupled by way of a tee 14 to the channels 12. The radar 13 in conjunction with antenna 10 operates in a conventional manner to transmit energy into space and to detect returns reflected from projectile 11.

The channels 12 also lead to a microwave reservoir which is a resonant sphere 20. The sphere 20 is connected to a plurality of channels, such as channels 21 and 22, to the antenna 10 all by way of tees represented by the tee 14.

The radar unit 13 is also coupled by way of channel 23 to sphere 20. The radar unit 13 is connected by way of a control channel 24 to laser units 25. As will later be explained, the channels 21 and 22 leading to the sphere 20 are coupled to the sphere 20 by way of dump switches located at the juncture of sphere 20 and the channels 21 and 22. The dump switches are actuated by energy transmitted by way of laser beams from the laser 25. Sphere 20 has superconducting walls maintained at a supercooled condition as by liquid helium circulating in the walls. Laser beams from laser 25 are focused onto windows locally to heat them to cause the microwave energy stored within sphere 20 to be dumped into the channels 12 and thence transmitted by way of radar antenna 10 to impinge the projectile 11. The microwave energy from the radar antenna 10 travels at the speed of light making it possible to repeatedly impact the projectile 11 during its course of flight. The repetition rate depends upon the rate at which build-up of energy in sphere 20 reaches the necessary level to transmit bursts of electromagnetic energy from antenna 10 which would be destructive of the projectile 11 or parts thereof. Thus, high energy bursts of microwave radiation are directed at target 11 which could be, for instance, an I.C.B.M. warhead, a satellite, a submarine launched ballistic missile or an aircraft. The system also acts, at a much lower power level, as its own acquisition phased array radar system.

The high power system is composed of a multiplicity of megawatt power tubes in radar unit 13 coupled to the large superconducting lined resonant cavity 20. By providing a high "Q" cavity, only minimal power is required to offset high frequency skin losses. Typically cavity 20 may have a radius of 10 meters with a field level of $1 \times 10^6$ volt/cm therein. Stored energy of $1 \times 10^8$ joules can be maintained during operative periods. Pure niobium forming the walls of resonator 20 has heretofore similarly been employed in systems in which such field levels were present. Other alloys and materials can operate at even higher levels in which case the system dimensions could be reduced. By applying very rapid rise time ($\approx 1 \times 10^{-8}$ sec.) heating to local areas of thin film superconducting dump switches the stored energy is coupled via a multiplicity of high pressure inert gas horns into the atmosphere without breakdown. In about $1 \times 10^{-6}$ seconds the energy is coupled out of resonator 20. Thus, a pulse of duration $1 \times 10^{-6}$ to $1 \times 10^{-7}$ seconds with power of $1 \times 10^{14}$ to $1 \times 10^{15}$ watts is generated. Such horns form the integral phased array antenna 10. The antenna thus excited illuminates with a central energy lobe $2 \times 10^{-4}$ radians wide when using 3 cm radiation from a 500 foot base. At a 100 mile range, the central lobe has a width of 100 feet. An object with a linear dimension of 5 feet would intercept approximately $(5/100)^2$ or $\frac{1}{4}\%$ of the burst of radiated energy. This is $\approx 3 \times 10^5$ joules which would cause significant damage such as blowing off several grams of vaporized material upon absorption. At the same time, shocks would be generated in the object of as much as 100 kilobars.

A recycle time of one second, and hence a pulse rate of 1/second may be maintained by a power source of $1 \times 10^8$ watts. A target moving at 5 miles a second would receive about 200 bursts in 100 miles with shocks of varying strengths. By increasing the amount of power available, a pulse rate of 10 per second is feasible and 200 bursts could impact either on one, or several targets within range.

The effects on a body of high energy bursts are two-fold: (1) the shock kill mechanism and (2) the material ablation could reach proportions sufficient to deflect and randomize the impact point sufficiently to make the system inaccurate and useless. If a satellite has a non-metal absorptive skin in the X-band, minimizing the radar echo cross section, such a skin would ideally absorb most of the burst energy, ablating from 100 gms/burst at a 100 mile range to 10 Kg/burst at a 10 mile range. This may reduce the shock strength into the 10 Kilobar range, but would cause sufficient ablative damage and orbital error to cause a large random miss-distance which could be from 2 to 10 miles for a one ton object.

Normally power is required only to operate low energy radar search and acquisition and to run the vacuum pumps to maintain the main resonator liquid helium bath temperature and void gas dump dewar temperature. During an emergency such as an I.C.B.M. attack, about $2 \times 10^8$ watts per site is required. This requirement may only last, at a given site, for a few minutes. The power is used to fill the resonator from beam power tubes. The resonator with niobium walls at liquid helium temperatures has "Q's" of the order of $1 \times 10^{11}$. Replacement of energy is required only once every $Q/\omega$ seconds (1 to 2 seconds). Helium is not cooled against the skin losses directly, but rather exposed to a low pressure, large volume, precooled gas dump chamber which is pumped down to a low temperature over a longer period of time. The gas dump chamber operates for a few minutes with no external power required. The dump chamber preferably is a large racetrack shaped ring buried around the resonator, with a minor radius of the order of 30 feet and a major diameter of 1000 feet. Such system may operate for about two minutes with no rise in the bath temperature of the resonator. In such period of operation about $1 \times 10^6$ liters of liquid helium bath would boil off.

In an emergency, resources of a major power grid would be diverted to sites at which this invention is installed. Some sites with magneto hydrodynamic generators capable of independent operation might also be used, but the diversion or use as the case may be would be of short duration.

Figure 2:
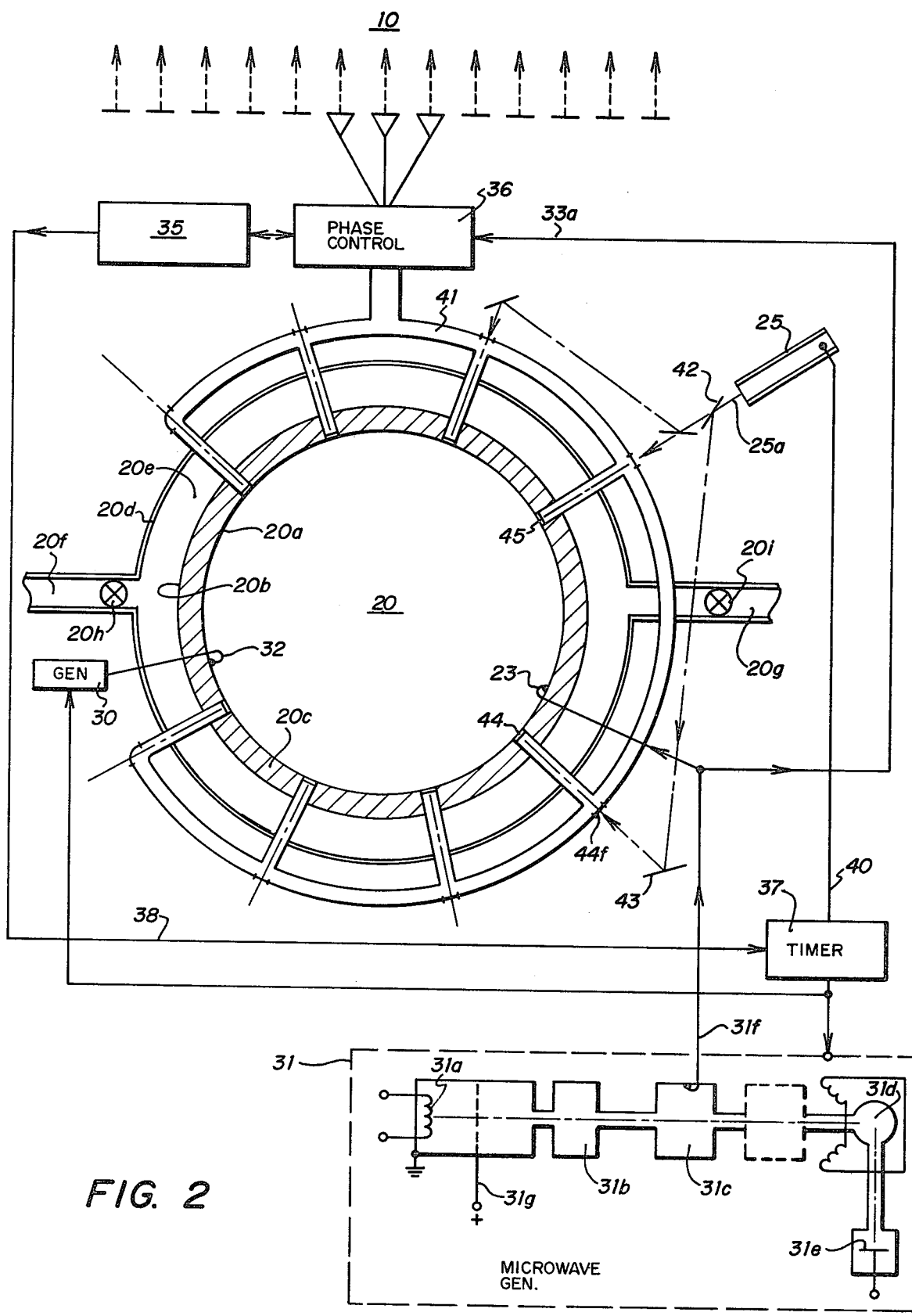
FIG. 2 is a schematic sectional view of the reservoir of FIG. 1.

Referring now to FIG. 2, the sphere 20 has been shown in greater detail and comprises an inner liner or wall 20a and an intermediate liner 20b. The zone 20c between liners 20a and 20b is a metallic honeycomb filled zone through which liquid helium is caused to flow to maintain the inner liner 20a at about the temperature of liquid helium, thus making it superconductive. Preferably, the inner liner 20a is a suitable metallic shell having a niobium or niobium alloy film thereon which may be made superconductive.

The outer shell 20d encompasses the intermediate shell 20b with a zone 20e therebetween which similarly has liquid hydrogen therein. Pipes 20f and 20g lead through the outer liner 20d to a gas dump, later to be described. More particularly, a plurality of pipes 20f and 20g extend radially from sphere 20 and are provided with valves 20h and 20i.

The sphere 20 is loaded on command with microwave energy from a plurality of generator sets such as the sets 30 and 31. The generator set 30 is coupled to the sphere by way of an input channel 32. The generator set 31 is connected into the sphere 20 by way of a channel 33. The microwave generators 30 and 31 may comprise multiple units such as klystron tubes which are maintained at cryogenic temperatures. As illustrated in FIG. 2, several tubes are to be included in unit 31, only one being shown. The tubes are identical and each includes a cathode 31a in a first cavity which leads to a buncher cavity 31b which in turn is connected to an output cavity 31c. The beam then passes through a magnetic deflecting unit 31d to a dump anode 31e. The output cavity 31c is connected by way of channel 31f to the input channel 33 leading to the sphere 20. A grid is maintained at a very high potential, of the order of 200,000 volts, for operation at high power levels as will be described wherein a plurality of like tubes in each unit 30 and 31 are operated in parallel.

Generators 30 and 31 operate under the control of the radar control unit 35. The control unit 35 controls the phase of microwaves in the various channels in unit 36 so that the beam from the radiating elements in antenna 10 can be focused or directed to any given direction above the plane defined by the phased array antenna elements. Targets are identified by the control unit 35 operating at low power supplied via channel 33a. In response to detecting a target a timer 37 is actuated by way of channel 38 to turn generators 30 and 31 on to high power thereby initiating high level flow of microwave energy into sphere 20. Timer 37 also applies periodically a trigger pulse by way of channel 40 to each of a plurality of lasers. Only one laser 25 has been shown producing a laser beam which momentarily heats windows in the walls of the sphere 20 in order to dump the microwave energy stored therein into the wave guides 41 which lead to the phase controlled unit 36. As indicated in FIG. 2, the laser beam 25a passes through while being partially reflected by a mirror 42. The beam thus reflected is again reflected by a mirror 43 to impinge a window 44 in the wall of sphere 20. The portion of the beam passing through mirror 42 illuminates and heats the skin on window 45. The other windows similarly are simultaneously heated. The laser beams together with the structure of the window 44, 45 etc. operate as dump switches. As indicated in FIG. 2, there are many dump switches located around the wall of the sphere 20, only eight such window dump switches being shown in FIG. 2. The dump switches lead to the wave guide 41 so that the energy may be transmitted through the phase control unit to the various elements in the antenna 10 to radiate a high energy burst into the atmosphere and to the target to which the array 10 is directed.

Figure 3:
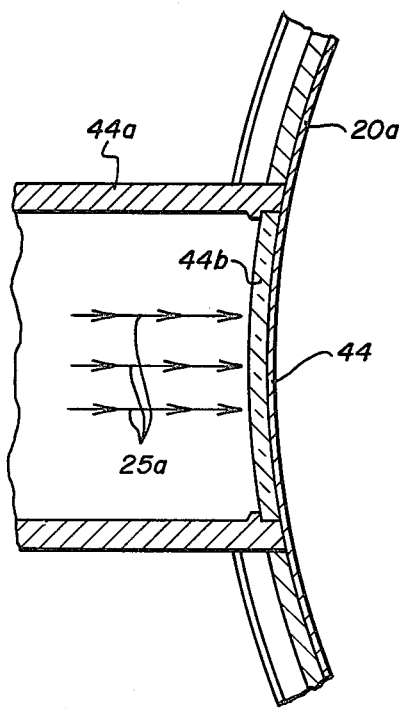
FIG. 3 is a view of a portion of the wall of the reservoir of FIG. 1 illustrating a window therein.

In FIG. 3 the structure of the window 44 has been shown in section. A wave guide 44a passes through the wall of sphere 20 to the layer 20a which is a superconducting skin lining sphere 20. A quartz plate 44b is mounted in the wave guide 44a immediately behind the layer 20a. The quartz layer is thus transmissive as to the laser beam 25a which is directed axially along the wave guide 44a. The quartz is a high dielectric material but capable of supporting the film 20a and capable of passing the microwaves stored in sphere 20 when film 20a on the face of the quartz plate 44b is heated by the laser beam 25a to a temperature above the superconducting temperature.

Figure 4:
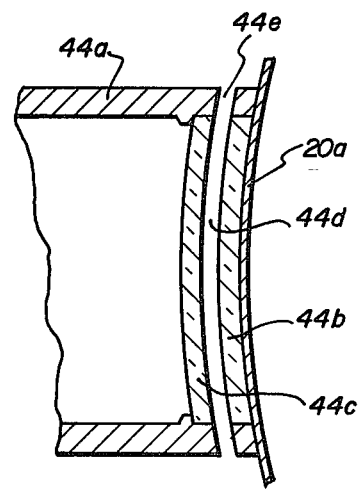
FIG. 4 illustrates a modified form in detail of one of the windows.

A modified form of the window is shown in FIG. 4. In this modification, the film 20a is backed by a first quartz plate 44b. A second quartz plate 44c is positioned behind plate 44b and is spaced therefrom so that a flow channel 44d is created between the confronting surfaces of the quartz plates 44b and 44c. The wave guide 44a has perforations 44e therein registering with the zone between plates 44b and 44c. By this means, liquid helium may flow between the two quartz plates from the zone 20c lying between the liners 20a and 20b of FIG. 2.

Figure 5:
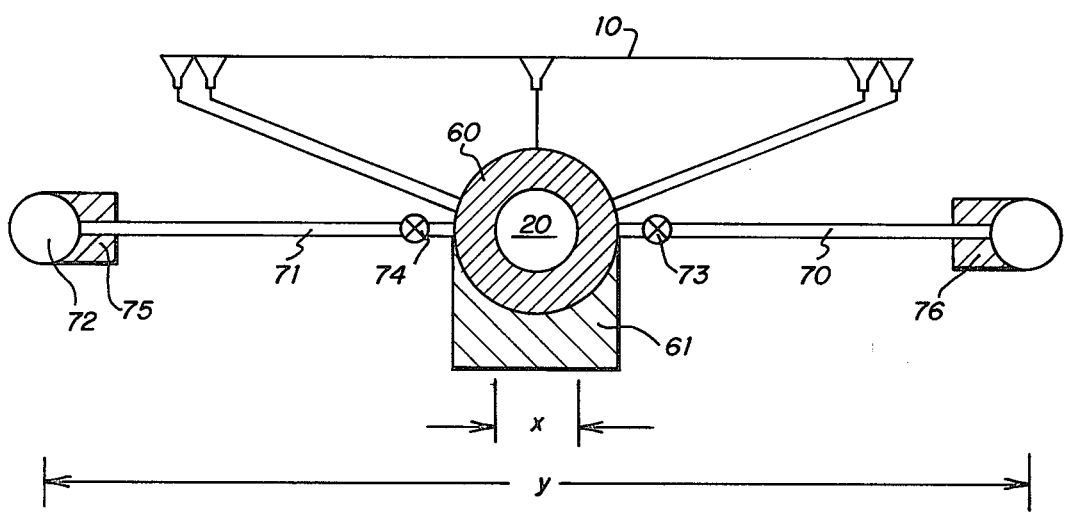
FIG. 5 illustrates an embodiment of the invention.

In FIG. 5 the system has been illustrated in a generalized form wherein the phased array antenna 10 is supported above the sphere 20. The sphere 20 is provided with an outer cover or shell 60 within which all of the components of the radar may be mounted except that a base portion 61 will be provided to house the microwave generators and associated electronics. The entire volume within housing 60 and within the unit 61 will be maintained preferably at cryogenic temperature.

A reservoir of liquified helium is maintained available for heat transfer from the zone encompassed by shell 60. More particularly, a plurality of radially extending tubes 70 and 71 lead to a chamber 72 which may be the racetrack shaped chamber above referred to. Valves 73 and 74 may be opened so that heat may be transmitted from components within the shell 60 to the reservoir of cooled helium in the chamber 72. The liquid helium in chamber 72 would be maintained cool by conventional liquifying apparatus contained in the units 75 and 76. Normally when the system is operating in the search and acquisition mode only, valves 73 and 74 will be closed. The system in units 75 and 76 would be maintained on an operative basis to keep the helium in chamber 72 liquified. When high power bursts are to be generated, the valves 73 and 74 are opened to make available for cooling the vast reservoir of helium in chamber 72.

By way of example, the dimension (x) of the sphere 20 may be of the order of 60 feet. The maximum diameter (y) of the chamber 20 may be of the order of 1000 feet. The system would accommodate about two million liters of helium for cooling purposes.

Before a radar burst is triggered, the field level inside the resonator 20 is brought up to full power, requiring about $2 \times 10^8$ watts using beam power tubes as microwave source for excitation. This requires approximately one second.

The laser trigger pulse is applied via the wave guides through a quartz window 44f, FIG. 2, located on each guide into the intended focal plane of each dump window. The focal plane in FIG. 3 is within the quartz window 44b in resonator 20 just behind the thin niobium film 20a so that very fast local heating is applied to the film via conduction in the quartz. Low temperature quartz conducts heat away from the thin niobium film caused by the passage of a high power microwave pulse during the dump operation. The thermal diffusivity of quartz below 5° K. is less than or about the same as a metal. Quartz makes an ideal dielectric backing and heat sink for low temperature applications. When the superconductor film 20a is operating near 2° K., a 200 A° thickness is sufficient to completely reflect the field and establish the resonator modes. When the temperature is raised locally about 5° to 10° K., the local skin depth in the film 20a increases and the material switches into the normal conducting state. In the normal state, the film represents only about 1% of a skin depth. The radiation escapes through the ports very rapidly, being coupled and impedance matched to the traveling wave guide mode at the same frequency. During the approximately one microsecond when the power is flowing through the film, the current density in the metal in the normal state is, $$J = \sigma E_w \alpha Q^2 E_w \tag{1}$$

where:
$E_w$ = traveling wave amplitude;
$\sigma$ = conductivity; and
$Q$ = the Q of the liner 20a.

For a traveling mode to transmit the power from the cavity in time $\Delta t$ requires a field E given by $$\Delta t \frac{E^2}{8\pi} C = \frac{1 \times 10^8}{NS} \tag{2}$$

where N is the number of windows in area S each, C the speed of light. This means for NS approximately equal to one half the sperical resonator surface, and $\Delta t \approx 1$ $\mu$sec. that $E_{peak} = 5 \times 10^4$ volt/cm. After transmission to the high pressure horns in antenna 10, this field level $E_{peak}$ is finally reduced by increasing the radiating area to about ten times the resonator area to a value of about $1 \times 10^6$ volt/meter. Dealing with low temperature quartz behavior, the film 20a is thermally coupled to a diffusion depth approximately equal to 0.05 cm for 1 $\mu$sec. in the quartz. This provides a mass of about ten grams for a one microsecond pulse, and area approximately equal to 100 cm$^2$ per window. For a temperature rise not to exceed T=5° K. in the quartz to this depth, this requires no more than $\Delta E = M_Q C_Q \Delta T$ (where $M_Q$ is the mass of the quartz, and $C_Q$ is the specific heat of the quartz) joules be deposited in the film by the pulse. The pulse will carry $1 \times 10^5$ joules of electromagnetic energy per window. From the above relations, only about 200 joules can be accommodated and still use the low temperature quartz coupling. But this is the amount expected for the energy deposit, as the following shows: For the normal metal condition the cavity "Q" is known to drop to about $1 \times 10^5$ at 10° K. This means all the cavity energy would be absorbed in a time given by $Q/\omega = 1 \times 10^{-5}$ sec. For 1% of a mean free path in the film (1% of a skin depth) only about $1 \times 10^4$ watts/cm$^2$ is deposited or about a few joules per microsecond per window. This is well within the capacity of the available heat sink. Note that if this energy were deposited only within the metal skin of area 100 cm$^2$, the temperature rise would be at least a few thousand degrees K., and would probably ablate the film.

In a phased array system, the microwave beam can be made very directional and approach a theoretical paraboloid reflector surface. The approximate angular width of the ½ energy points can be estimated from the relation for a paraboloid:

$$\theta = (7 \times 10^4)/fD \quad (3)$$

where
 $\theta$ = beam angle in degrees;
 f = frequency in megahertz; and
 D = diameter of phased array (paraboloid) feet.

Hence, for a "baseline" or equivalent paraboloid diameter of 500 feet and f = 10,000 Hz (3 cm. radiation), $\theta = 2 \times 10^{-4}$ radian. At a range of 100 miles (500,000 feet) the main energy lobe covers about 100 feet. If D is measured in cm., f in c.p.s., and the angle $\theta$ in radians, $\theta = (3 \times 10^{10})/fD$.

A target having linear dimension, L, such that $L >> \lambda$, has a radar intercept cross section approximately equal to its geometrical projected area. Hence, if R = range in cm and $\delta$ = fraction of total pulse intercepted, $\delta = (\pi/2)(L/R)^2(D/\lambda)^2$. For example, if $L \approx 5$ feet, R = 500,000 feet, $(L/R)^2 = 1 \times 10^{-10}$, $(D/\lambda) = 0.25 \times 10^8$, $\delta = \pi \times 10^{-10} 0.25 \times 10^8 = 0.005$ or ½%. At 33 miles, this is 4% and at 10 miles $\approx 40\%$. A target moving at 5 mi./second would receive from 30-40 pulses in 100 miles at a rate of 2/second. The average energy is that intercepted at 33 miles in this case, being the average over range.

$$<\delta>_R = \frac{\pi}{2}(D/\lambda)^2(L)^2 \frac{1}{(R_{max} - R_{min})} \int_{R_{min}}^{R_{max}} \frac{dR}{R^2} \quad (4)$$

Assuming $R_{max} \approx 100$ miles, $R_{min} \approx 10$ miles, a target either has (1) generated within it $\approx 30$, 200 kilobar shocks or (2) about 30, 20 kilobar shocks, plus an ablation of about 50 Kg of material causing a consequent change in momentum of about 1-10% and so a randomization of from one to ten miles in circular error probable. This depends upon whether the target (1) reflects part of the radiation with metallic like skin depths or (2) is very absorptive at X-band. In either case, components inside the target may be deformed and rendered inoperative. Tracking the target is done via phase shifting electronically in known manner as generally shown in U.S. Pat. Nos. 3,460,149 to Logan and 3,454,945 to Hyltin.

The target will not be able to manuever to avoid the burst since it travels at the speed of light. A target traveling at 5 miles a second could move only ten feet during a maximum range 100 mile transit time for the burst. It will be located near the center of the central lobe. It would move only 0.03 feet even for a one microsecond pulse duration.

For a $1 \times 10^8$ joule system, and a one microsecond pulse, $1 \times 10^{14}$ watts is radiated. At a field level of $1.5 \times 10^6$ volt/meter, about $6 \times 10^9$ watts/M² can be radiated. This requires a total radiating area of about $2 \times 10^4$ M². Hence, a 100 meter square array will prevent atmospheric breakdown.

The system including cavity 20 then is a large honeycomb structure lined with a superconductor which is spherical and excited to a field level at the wall of about $1 \times 10^6$ volt/cm. to avoid magnetic breakdown. This requires a radius of about ten meters to store $1 \times 10^8$ joules, thus a 60 foot diameter sphere. The sphere is cooled by superfluid liquid helium in the honeycomb and surrounding bath. With little power this helium bath can be maintained against heat leak to the atmosphere via a simple dewar wall design.

During operation, a helium gas dump chamber, surrounding the cold liquid helium reservoir, is used to pump the helium vapor during an emergency; the void dewar is recycled and maintained at about 1.7° K. by ordinary vacuum pumps when not in emergency use, although over a much longer time. Coupling from the sphere 20 to the radiation impedance is accomplished by first vacuum wave guide transmission to each of vacuum side horn windows. From there the horns are high pressure inert gas (e.g. argon) coupled between the high vacuum side and the atmospheric window side. About 1000 horns with an exit area $\approx 10$ M² are employed in antenna 10. They are part of the phased array radiation system and are preferably fed via about 100 dump switch areas on sphere 20.

In conventional klystron tubes the pulse length obtainable is determined primarily by the electron beam dump anode. For example, tube 31 of FIG. 2 may be operated conventionally to generate a 10 megawatt pulse for a few microseconds by a 100 amp, 200,000 volt beam at about 50% efficiency at $\lambda \approx 3$ cm (X-band).

The beam is generated at cathode 31a, accelerated by the 200,000 volt potential on grid 31g and sent through the buncher cavity 31b. The bunched beam is then drifted to maximum bunching time and then either put back through the same cavity (reflex klystron) or through an output cavity 31c. After this stage, high energy microwaves are extracted. The beam is still at 100 amperes at about 100,000 volts. This is a 10 megawatt beam. This beam is absorbed onto an anode. The anode can only absorb this energy for a short pulse time without over heating and destruction. Hence pulses of only a few microseconds have been possible.

In accordance with this invention means are provided to eliminate this drawback. Microwaves at 10 megawatts are generated, continuous wave. Some small skin losses in the cavity walls must be taken into account, but this is a relatively minor problem.

In this invention large cryogenic capacity is utilized. This is accomplished by employing two features:
 (1) use of superconducting output cavities to eliminate wall skin losses, and
 (2) allowing the electron beam to pass out from the output cavity into a vacuum region pipe through a port.

The beam is then passed through another resonant output cavity system (klystron) 31f and in like manner used over again several times until most of the beam energy is used up. It then is diverted through a superconducting magnet beam diverter and dumped onto a large absorbing and if necessary ablative anode. Alternately, the beams are decelerated through a D.C. potential to deliver residual power back to the power supply system.

With known techniques (100 amp, 200,000 volts), a continuously operating electron beam system of klystrons operates continuous wave.

In order to power up the main resonator with energy $1 \times 10^8$ joules/sec = 100 microwave, about 10 klystron power tubes are required. The unit may run continuously. It can be multiple stage and then diverted to the decelerating electrode 31e. Sphere 20 is fed from a continuous electron beam power tube system which may employ 2 to 5 tubes per beam and 2 to 5 beams.

Having described the invention in connection with certain specific embodiments thereof, it is to be understood that further modifications may now suggest themselves to those skilled in the art and it is intended to cover such modifications as fall within the scope of the appended claims.

What is claimed is:

1. A high energy microwave system for directing energy bursts of microwave radiation at a target comprising:
   (a) a microwave cavity having superconducting walls for storing microwave energy,
   (b) generating means for feeding waves of microwave energy into said cavity,
   (c) transmitting means coupled to said cavity for directing microwave energy toward said target, and
   (d) tracking means connected to said transmitting means for initiating flow of microwave energy to said cavity upon locating said target and triggering said transmitting means a predetermined time after initiating said flow to said cavity for directing a burst of electromagnetic energy to said target.

2. A defense system comprising:
   (a) a phased array radar adapted to intercept and follow a target path including an antenna array and a low level channel of microwave energy for exciting the elements of said array to produce radar returns and define said path,
   (b) a microwave storage reservoir,
   (c) means to supply upon interception of said target a high level flow of microwave energy to said reservoir,
   (d) microwave feed channels leading from said reservoir to the elements of said antenna array,
   (e) microwave dump switches at the juncture of said channels with said reservoir, and
   (f) means responsive at least in part to said returns for actuating said dump switches for flow of bursts of microwave energy from said reservoir to said target via said antenna array.

3. The combination set forth in claim 2 wherein said reservoir is maintained at a temperature near 0° K. to prevent losses in the walls thereof.

4. The combination set forth in claim 2 wherein said dump switches comprises:
   (a) wave guides extending to the wall of said reservoir,
   (b) a superconductive layer lining said reservoir and covering each of said wave guides,
   (c) a heat conductive dielectric member in each said wave guide backing said layer, and
   (d) means to heat said member locally to change the conductivity of said layer at the mouth of each wave guide.

5. The combination set forth in claim 4 wherein said layer is of a niobium material and said dielectric member is quartz.

6. The combination set forth in claim 4 wherein said means to heat said dielectric member is a laser producing a beam directed onto said member.

7. A method of employing high level microwave energy bursts to do work on a moving target at a distance comprising:
   (a) locating and tracking said target with low energy microwave radar transmissions,
   (b) upon locating said target initiating flow of high level microwaves to cryogenically controlled storage, and
   (c) after reaching a predetermined level of energy in storage abruptly dumping said energy via the same path as said radar transmissions to impact said target by locally heating exit locations in the walls of said storage to trigger dumping of said energy.

8. A defense method comprising:
   (a) operating a phased array radar to intercept and follow a target path by focusing an antenna array in a low level channel of microwave energy to produce radar returns defining said path,
   (b) supplying upon interception of a target a high level flow of microwave energy to a cryogenic microwave storage reservoir, and
   (c) responsive at least in part to said returns, actuating localized zones in the walls of said reservoir to render them transmissive for dumping microwave energy from said reservoir onto said target through said antenna array.

9. A high energy microwave system for directing energy bursts of microwave radiation at a target comprising:
   (a) a microwave reservoir of the order of 10 meters radius lined with a niobium layer,
   (b) a liquid helium system to maintain said layer superconducting during storage of microwave energy in said reservoir,
   (c) generating means for feeding microwave energy into said reservoir,
   (d) wave guides leading from said reservoir,
   (e) a phased array radar means coupled to said wave guides for directing microwave energy from said reservoir toward said target,
   (f) a quartz barrier closure for each of said wave guides contacting said barrier in heat transfer relation, and
   (g) laser means connected to said phased array radar means for heating said quartz to cause flow of microwave energy from said reservoir in predetermined relation to flow of energy to said reservoir.

* * * * *